(12) United States Patent
Bussieres et al.

(10) Patent No.: US 11,293,834 B2
(45) Date of Patent: Apr. 5, 2022

(54) MEASURING DEVICE AND METHOD FOR OPTICAL FIBERS

(71) Applicant: ID QUANTIQUE SA, Carouge (CH)

(72) Inventors: Felix Bussieres, Vessy (CH); Bruno Sanguinetti, Geneva (CH)

(73) Assignee: ID QUANTIQUE SA, Carouge (CH)

( * ) Notice: Subject to any disclaimer, the term of this patent is extended or adjusted under 35 U.S.C. 154(b) by 0 days.

(21) Appl. No.: 16/474,347

(22) PCT Filed: Dec. 21, 2017

(86) PCT No.: PCT/EP2017/084268
§ 371 (c)(1),
(2) Date: Jun. 27, 2019

(87) PCT Pub. No.: WO2018/122130
PCT Pub. Date: Jul. 5, 2018

(65) Prior Publication Data
US 2019/0331550 A1 Oct. 31, 2019

(30) Foreign Application Priority Data
Dec. 28, 2016 (EP) ..................................... 16207095

(51) Int. Cl.
*G01M 11/00* (2006.01)
(52) U.S. Cl.
CPC .............................. *G01M 11/3145* (2013.01)
(58) Field of Classification Search
CPC ............ G01M 11/00; G01M 11/3145; G01M 11/3136; G01M 11/3109; G01M 11/3118;
(Continued)

(56) References Cited

U.S. PATENT DOCUMENTS 5,754,284 A 5/1998 Leblanc et al.
7,411,666 B2 8/2008 Beller et al.
(Continued)

FOREIGN PATENT DOCUMENTS

CN 1712917 A 12/2005
CN 1330949 C 8/2007
(Continued)

OTHER PUBLICATIONS

International Search Report for PCT/EP2017/084268 dated Mar. 20, 2018.
(Continued)

*Primary Examiner* — Jamil Ahmed
(74) *Attorney, Agent, or Firm* — Millen, White, Zelano & Branigan, P.C.; William Nixon (57) ABSTRACT

The present invention relates to a measuring device (3000) for measuring reflection in an optical fiber (1400), the device comprising: emitting means (3100) connected to the optical fiber (1400) and configured to emit light into the optical fiber (1400), measuring means (3300) connected to the optical fiber (1400) and configured to receive a reflected light from the optical fiber (1400), wherein the measuring means comprises a first photon detector (3310) and a second photon detector (3311), wherein the operation of the second photon detector (3311) and/or the reflected light reaching the second photon detector (3311) is controlled based on an output of the first photon detector (3310).

10 Claims, 5 Drawing Sheets

(58) Field of Classification Search
CPC ......... G01L 1/242; H04B 10/071; G01B 9/02; G01N 21/00
See application file for complete search history.

(56) References Cited

U.S. PATENT DOCUMENTS

| | | | |
|---|---|---|---|
| 7,593,098 B2* | 9/2009 | Brendel | G01M 11/3145 |
| | | | 356/73.1 |
| 8,654,320 B2 | 2/2014 | Hasegawa et al. | |
| 8,947,659 B1 | 2/2015 | Baastians et al. | |
| 9,234,937 B2 | 1/2016 | Eliyahu et al. | |
| 9,435,712 B2 | 9/2016 | Chen et al. | |
| 2007/0091297 A1* | 4/2007 | Beller | G01M 11/3109 |
| | | | 356/73.1 |
| 2008/0106745 A1* | 5/2008 | Haber | G01L 1/242 |
| | | | 356/519 |
| 2008/0231842 A1* | 9/2008 | Brendel | G01M 11/3145 |
| | | | 356/73.1 |
| 2011/0102776 A1* | 5/2011 | Hasegawa | G01M 11/3136 |
| | | | 356/124.5 |
| 2015/0062563 A1 | 3/2015 | Ahadian et al. | |
| 2016/0187224 A1 | 6/2016 | Chen et al. | |
| 2017/0366257 A1* | 12/2017 | Hayward | H04B 10/071 |
| 2019/0128775 A1* | 5/2019 | Rapp | G01M 11/3118 |

FOREIGN PATENT DOCUMENTS

| | | |
|---|---|---|
| CN | 102667506 A | 9/2012 |
| CN | 103472455 A | 12/2013 |
| EP | 2284514 A1 | 2/2011 |
| JP | S5892926 A | 6/1983 |
| JP | 2008233115 A | 10/2008 |
| WO | 2006002689 A1 | 1/2006 |
| WO | 08028138 A2 | 3/2008 |
| WO | 09147963 A1 | 12/2009 |

OTHER PUBLICATIONS

English Abstract for JPS5892926, Publication Date: Jun. 2, 1983.
English Abstract of JP2008233115, Publication Date: Oct. 2, 2008.
Office Action and Search Report in corresponding CN appl. 201780081138.0 dated Oct. 9, 2020 (pp. 1-11).
English translation of the second Office Action in corresponding CN201780081138.0 dated Jun. 18, 2021 (pp. 1-12).

* cited by examiner

MEASURING DEVICE AND METHOD FOR OPTICAL FIBERS

The present invention generally relates to a measuring device and method for measuring reflection in an optical fiber. In particular, it relates to the field of optical time domain reflectometry. Even more specifically, it relates to an improved device and method that allows measuring the Rayleigh backscattering of the parts of an optical fiber following a reflection portion, such as a defect or a connection.

PRIOR ART

Optical time domain reflectometry (OTDR) is widely used in the field of telecommunications for measuring reflection in an optical fiber. In OTDR, a short pulse of light, typically laser light of duration between 10 picoseconds to 1 microsecond, preferably 30 picoseconds to 10 nanoseconds, is injected into an optical fiber, usually referred to as the fiber under test, or FUT.

In the optical fiber, part of the light is reflected toward the injection side. The reflection can be due to Rayleigh backscattering and/or to local defects and/or to connections between the optical fiber and other components. The reflected light returning from the fiber is collected by a photodetector, for instance a photodiode, and the value of the reflection is recorded as a function of the detection time.

In this manner, a spatially resolved analysis of the backscattered signal over the entire length of the optical fiber is obtained. By reviewing the recorded amplitude of the reflected signal versus time trace, a user may identify breaks, damage, strong reflections, bad connections, strong bends, crushing, and other characteristics of the optical fiber.

With very short laser pulses being launched into the optical fiber, the OTDR is able to achieve a high temporal/spatial precision. However, to increase the resolution of the OTDR, the photodetector and the associated amplifiers needs to have a larger bandwidth. Such high-bandwidth devices have a lower sensitivity. For this reason, conventional OTDRs are unable to simultaneously achieve high spatial/temporal resolution and high sensitivity.

A photodetector that performs photon counting may provide a very high sensitivity and high temporal resolution. Photon counting allows detecting very low light levels, down to the single photon level. Photon counting techniques may achieve a temporal resolution of better than 1 nanosecond. However, photodetectors that perform photon counting have a limited dynamic range. The dynamic range of an OTDR is the difference between the highest and the lowest measurable backscattering or back-reflected signal. Since a photon-counting OTDR cannot detect more than one photon for each emitted laser pulse, high backscatter levels lead to a saturation of the photodetector.

Figure 1:
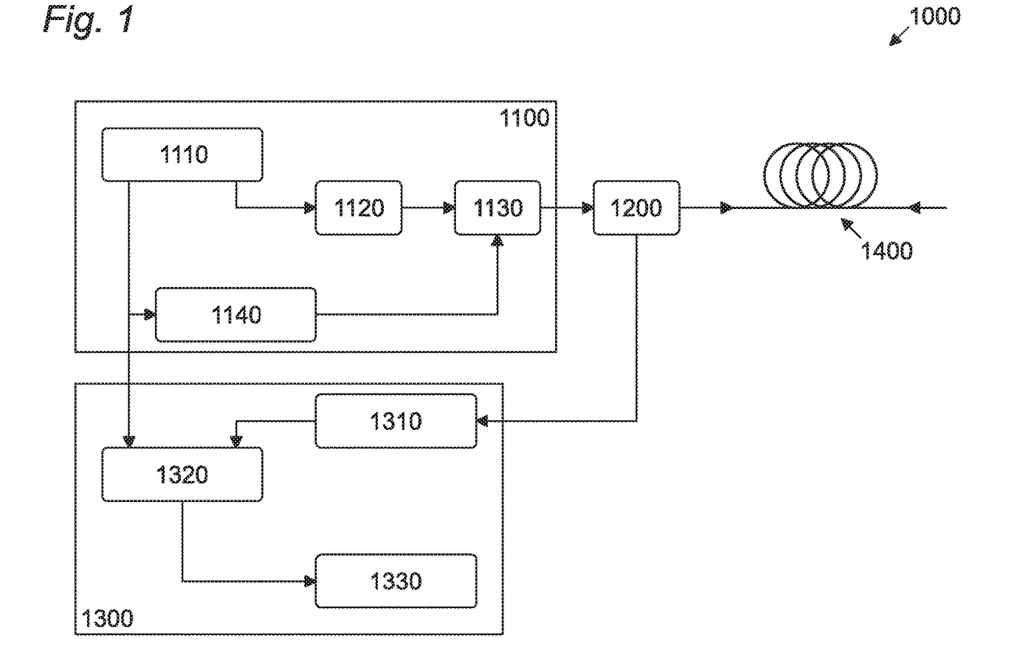
FIG. 1 schematically illustrates a measuring device 1000 according to the prior art.

FIG. 1 schematically illustrates a measuring device 1000 according to the prior art. In particular, measuring device 1000 comprises emitting means 1100 that are generally capable of emitting a pulsed light with the desired intensity and length. In the specifically illustrated embodiment, the emitting means 1100 comprise a pulse driver 1110 driving a Fabry-Perot laser 1120. In order to compensate the light leakage, an acousto-optic modulator 1130 is controlled by a pulse pattern generator 1140.

The measuring device 1000 further comprises a circulator 1200 connected to the emitting means 1100 and to the optical fiber under test 1400. As schematically illustrated, the light entering the optical fiber 1400 is partially reflected and, when going back through the circulator 1200 it is directed to a measuring means 1300.

The measuring means 1300 comprise a photon detector 1310, preferably a single-photon detector, connected to a time to digital converter 1320, which provides timestamps to the output of the single photon detector 1310. Those timestamps are analyzed by a data acquisition terminal 1330 connected to the time to digital converter 1320 in order to determine the delay between the device 1000 and reflection events in the optical fiber 1400.

Figure 2:
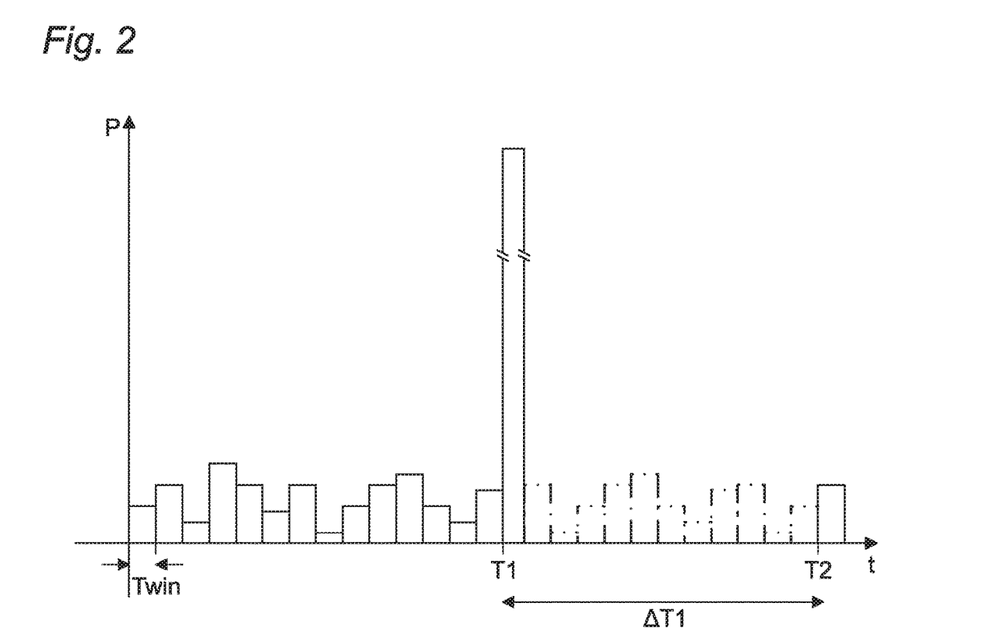
FIG. 2 schematically illustrates an exemplary output of the device 1000.

FIG. 2 schematically illustrates an exemplary output of the device 1000. In particular, in FIG. 2, the Y axis represents the number of photons detected by the device 1000 while the X axis represents time, or the equivalent distance to the reflecting event.

As can be seen between 0 and T1 the histogram indicates a certain number of photons counted at a given time. For a given power and width of the pulse injected into the optical fiber, a normal number of photons for the Rayleigh backscattering can be relatively low, in comparison with higher level reflections which will be described later. The absolute amount of photons depends on the power of the emitting means 1100, the time during which the reflection signal is integrated and other variables. At time T1, a comparatively higher number of photons is detected, due for instance to a more powerful reflection event, such as a connection between the optical fiber 1400 and another element. The signal at time T1 can be 10-100 dB higher than the signal due to the Rayleigh backscattering. This is problematic since the high number of photons detected at time T1 effectively blind the measuring means 1300, in particular the photon detector 1310, for a time interval $\Delta T1$, between T1 and T2, which is generally longer than the measuring resolution Twin of the device, as illustrated. This results in the Rayleigh backscattering following T1 and until T2 not being detectable by the device 1000. This is illustrated by the dotted lines, so as to schematically illustrate what the measuring device 1000 should be capable of measuring if it weren't saturated by the detection at time T1.

Even more specifically, when the photon detector 1310 measures the reflection signal, at each measuring window it has a probability to detect or not a photon which depends on the number of photons in the reflection. Once the photon detector 1310 detects a photon, it needs a certain time to become operational again and be capable of carrying out a new detection. This time corresponds to $\Delta T1$, usually referred to as dead-time, and effectively indicates a time interval during which the photon detector 1310 is effectively blind.

When the signal reaching the photon detector 1310 is low, such as previous to T1, the photon detector has a certain probability to trigger at each measuring window Twin. For instance, during a first measurement, it may trigger at the first measuring window, while during a second measurement it may not, and it may instead trigger at the second measuring window. In the end, the number of times for which the photon detector will trigger at each measurement interval will be proportional and indicative of the number of photons received during the given measurement interval.

However, if there is a measurement window Twin during which a comparatively high reflection occurs, such as at T1, the probability of the photon detector 1310 to trigger at this time interval is very close to 1. This results in the photon detector 1310 to never be able, even for a very large number of measurements, to measure the reflection in the measuring windows following T1, for a period of time equal to $\Delta T1$. A In the following this high probability of experiencing a dead-time in a given measuring window will also be referred to as the photon detector being saturated. That it, from a probability point of view, there is a saturation effect in that the photon detector has such a high probability to trigger at T1 that any subsequent measurement becomes practically impossible due to the dead-time.

This is problematic since, in several practical applications, it is interesting to know the reflection level after T1. For instance, from the values just before and after the event at T1 it is possible to measure the insertion loss at optical connections.

To solve this problem, a measuring device of the prior art, disclosed for instance by document U.S. Pat. No. 7,593,098, teaches to use a short pulse and a moving window for the detection. In other words, the measuring means 1300 are turned on for only the duration of a single measuring window Twin, which can be for instance substantially corresponding to the pulse length of the light pulse emitted by the emitting means 1100, and the measuring window is moved along the time axis. Said otherwise, a first measurement is performed at the window 0-Twin, a second measurement at the window Twin-2Twin, then a third measurement at 2Twin-3Twin and so on.

The advantage of this approach consists in the fact that once the measuring window Twin reaches the powerful reflection event at T1, the photon detector 1300 will always trigger. Nevertheless, once the measuring window is moved to the one right after T1, since the photon detector 1300 only measures during such short measuring window, it will not measure T1 and it will therefore be capable of measuring the reflection value after T1.

The disadvantage of this approach consists in the fact that, in order to have the required spatial resolution, the value of Twin must be low. However, by reducing the value of Twin, the number of measurements needed to cover a long optical fiber 1400 may become very high. Even if each single measurement can be performed relatively quickly, the combined total measurements may therefore take a long time, such as one hour or more, which is not considered acceptable in practical applications.

OBJECT OF THE INVENTION

The present invention has therefore been developed with the aim of allowing a precise and quick measurement of reflection in the optical fiber 1400.

It is therefore an object of the invention to provide a device and/or a method for measuring reflection in an optical fiber in a relatively quick manner.

It is a further object of the invention to allow a precise measurement after a relatively higher reflection event in the optical fiber.

SUMMARY OF THE INVENTION

The inventors have generally realized that, instead of having a short moving measuring window, as in the case of the prior art, it is much preferable to have a long measuring window and only block the measurement during the powerful reflection event that would saturate the measuring device, rendering the measurement after the high-level reflection impossible, as previously described.

To do so, the inventors generally realized that the measuring can be done with at least two photon detectors, where one detector acts as a peak detector while the second detector is used to measure the reflection. Even more specifically, the peak detector allows the measuring window of the second detector to exclude high-level reflections which would otherwise saturate the second detector. In other words, the peak detector can detect the high-level reflection and, based on an output indicating such event, the second photon detector can be temporarily isolated from the powerful reflection event, to avoid saturation at the second photon detector. The isolation can be achieved in several manners, such as by turning off the second photon detector and/or by modulating the intensity of the reflected light reaching the second photon detector.

Thanks to this general approach, the first photon detector functions as a warning signal, or as a peak detector, to avoid saturation of the second photon detector, which can therefore keep operating with a long measuring window, only temporarily interrupted at the time containing the high-level reflection.

In particular, an embodiment of the invention can relate to a measuring device for measuring reflection in an optical fiber, the device comprising: emitting means connected to the optical fiber and configured to emit light into the optical fiber, measuring means connected to the optical fiber and configured to receive a reflected light from the optical fiber, wherein the measuring means comprises a first photon detector and a second photon detector wherein the operation of the second photon detector and/or the reflected light reaching the second photon detector is controlled based on an output of the first photon detector.

Thanks to this approach it is advantageously possible to use the first photon detector as a peak detector, capable of detecting a signal above a predetermined threshold and use this information to prevent the saturation of the second photon detector, by turning it off.

In some embodiments, the measuring means can further comprise an intensity modulator, connected between the optical fiber and the second photon detector, and the intensity modulator can be driven based on the output of the first photon detector so as to control the reflected light reaching the second photon detector.

Thanks to this approach it is advantageously possible to control the amount of light reaching the second detector without turning it off.

In some embodiments, the measuring device can further comprise an optical delay element, connected between the optical fiber and the second photon detector.

Thanks to this approach it is advantageously possible to delay the signal reaching the second photon detector so as to timely react based on the output given by the first photon detector.

In some embodiments the optical delay element can introduces a delay on the reflected light which is equal to, or longer than, a time required by the first photon detector to detect the reflected light.

Thanks to this approach it is advantageously possible to provide a delay which allows the first photon detector to react.

In some embodiments the emitting means can be configured to emit a pulse of light having a predetermined pulse duration, and the intensity modulator can be configured to switch for a switching time equal to or, preferably larger that the pulse duration.

Thanks to this approach it is advantageously possible to correlate the time during which the second photon detector is protected from the high-level reflection with the duration of the pulse emitted from the emitting means.

In some embodiments, the switching time can be at least 1.5 times, preferably at least 3 times, even more preferably at least 5 times the pulse duration.

Thanks to this approach it is advantageously possible to account for a reflection which has a duration longer than the originally injected pulse due, for instance, to scattering of the signal along the optical fiber.

In some embodiments, the measuring device can further comprise an optical attenuator, connected between the optical fiber and the second photon detector.

Thanks to this approach it is advantageously possible to reduce the amount of light reaching the second photon detector. This is particularly advantageous as it allows the first photon detector to operate with a high signal level, which may reduce the costs of the first photon detector, while the second photon detector operates with a low signal level, so as to increase the precision thereof by allowing the use, for instance, of a single-photon detector.

DETAILED DESCRIPTION

In the following, preferred embodiments of the present invention will be described in detail with reference to the drawings. The following embodiments are provided only for illustrative purposes so that those skilled in the art can fully understand the present invention. Therefore, the present invention is not to be limited by the following embodiments but may be implemented in other forms, as defined by the claims.

In the drawings and in the description, equal reference numerals refer to equal elements. It will be understood that, in the drawings, the width, length and thicknesses of some elements may by exaggerated for convenience of illustration and ease of understanding.

Figure 3:
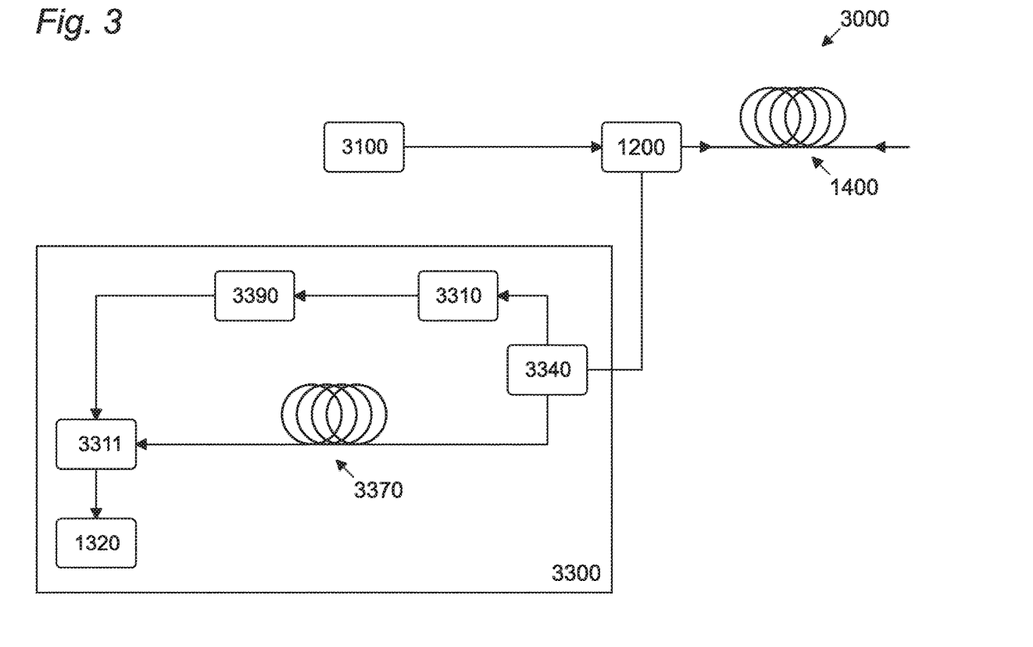
FIG. 3 schematically illustrates a measuring device 3000 according to an embodiment of the invention.

FIG. 3 schematically illustrates a measuring device 3000 according to an embodiment of the invention. In particular, the measuring device 3000 is adapted for measuring reflection in an optical fiber 1400, so as to allow the measurement of the characteristics of the optical fiber 1400.

The device 3000 comprises emitting means 3100 connected to the optical fiber 1400 and configured to emit light into the optical fiber 1400. The emitting means 3100 can generally be any means capable of emitting light, preferably pulsed light. A specific implementation of the emitting means 3100 could be the one of emitting means 1100 of the prior art. However also other implementations by means, for instance, of diodes, can be contemplated.

The measuring device 3000 further comprises measuring means 3300 connected to the optical fiber 1400 and configured to receive a reflected light from the optical fiber 1400. The measuring means 3300 can be connected to the optical fiber 1400 through a circulator 1200, as in the prior art. More in general any connection to the optical fiber 1400 which will allow the measuring means 3300 to measure light reflected from the optical fiber 1400 can be implemented. Although not illustrated, the measuring means 3300 can be connected to the emitting means 3100, or both can be connected to a non-illustrated clock, in particular in order to record the time difference between the emission of light by the emitting means and the recorded reflection by the measuring means 3300.

In particular, the measuring means 3300 comprises a first photon detector 3310 and a second photon detector 3311. One or both of photon-detectors 3310 and 3311 can be single-photon detectors. In some advantageous embodiments, it could be possible to implement the invention using a different kind of detector, in particular one with a lower precision in the detection, for the photon detector 3310. This is possible since the photon detector 3310, as will be detailed later, operates as a peak detector and is therefore only required to measure high-level peaks, while leaving the precise measurement on lower reflection levels to the photon detector 3311.

In the illustrated embodiment, the measuring means 3300 comprises a beam splitter 3340 which is configured to connect the optical fiber 1400 to both the photon detector 3310 and to the photon detector 3311. It will be clear that, in general, any means for connecting the optical fiber 1400 to photon detectors 3310 and 3311 can be implemented.

Moreover, in the illustrated embodiment, the measuring means 3300 comprises an optical delay element 3370 connected between the optical fiber 1400 and the photon detector 3311. In particular, it is connected between the beam splitter 3340 and the photon detector 3311. The optical delay element introduces a delay, having a predetermined value, on the optical signal going through it.

Thanks to this implementation, the output signal of the photon detector 3310 can be used to control the photon detector 3311 or control the amount of light reaching the photon detector 3311. This generally provides the advantage that saturation of the photon detector at the high-level reflection is avoided, as will be clear from the following. In particular, once the photon detector 3310 detects a high-level reflection, or a reflection level above a predetermined threshold, the output of the photon detector 3310 switches and can be used to turn off the photon detector 3311 such that saturation at the photon detector 3311 is avoided at time T1. In some embodiments, the predetermined threshold at which the photon detector 3310 switches can be chosen to correspond to a value at which the remaining part of the reflection, due to the splitting operated by the beam splitter 3340, would cause a saturation at photon detector 3311. Or, in some embodiments, to a value at which the remaining part of the reflection, due to the splitting operated by the beam splitter 3340, would cause a saturation at photon detector 3311 with a probability higher than a predetermined value.

In some embodiments a timing logic 3390 can be provided as part of the photon detector 3310 and/or 3311, or separately connected between the two, and can, upon detecting a switch of the output signal from photon detector 3310, substantially at time T1, eventually with a short delay required by the photon detector 3310 to switch, issue an output signal which will prevent the same high-level reflection signal to saturate the photon detector 3311. In particular, the timing logic can use the time T1 as a starting time, wait a time interval ΔT2 and then issue a signal having a length of ΔT3, as illustrated. When the photon detector 3311 receives a high value for the control signal issued by the timing logic 3390, it is turned off. When, after a delay ΔT3, the control signal is again low, the photon detector 3311 resumes operation. This is particularly advantageous if the dead-time of photon detector 3310 or photon detector 3311 is a time ΔT1 longer than time ΔT3. In other words, instead of being incapable of measuring for a time ΔT1 following T1, the photon detector 3311 only stops measuring for a time ΔT3 comprising T1. The measuring period during which the photon detector 3311 does not measure the reflection is therefore advantageously reduced, without requiring the complex and time-consuming moving measuring window of the prior art.

The duration ΔT3 for which the photon detector 3311 is turned off can be, for instance, equal to the duration of the pulse emitted by the emitting means 3100, or a multiple of it, as will be described later. In fact, the duration of the high-level reflection will be substantially similar to, or dependent on, the duration of the pulse that generated it. Also for this reason it can be advantageous to connect the emitting means 3100 to the measuring means 3300, so that the value of ΔT3 can be dynamically adapted based on the duration of the pulse emitted by the emitting means 3100.

Figure 4:
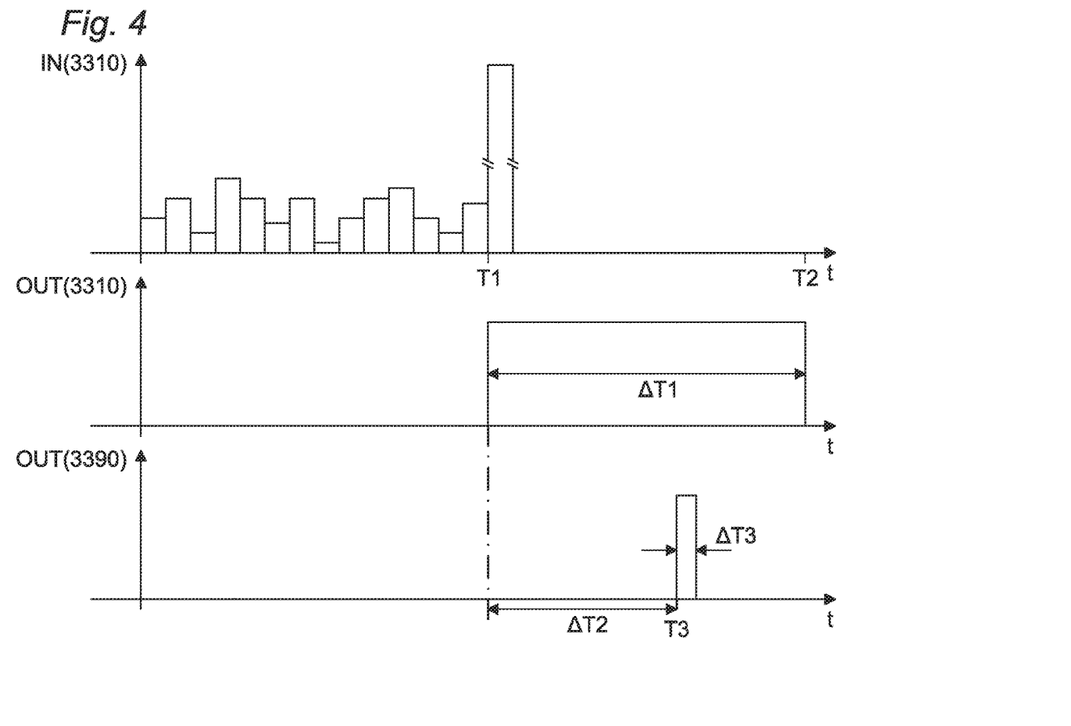
FIG. 4 schematically illustrates an operation of output of the device 3000.

FIG. 4 schematically illustrates an operation of output of the device 3000. As can be seen on the top chart, at time T1 the high-level reflection reaches the device 3000 and the input of photon detector 3310. The second chart from the top represents the output of photon detector 3310. Here the duration of the signal caused by the high-level reflection saturation is schematically illustrated as corresponding to the entire dead-time time ΔT1. It will be clear that, in alternative implementations, the duration of the signal could be actually limited to the duration of the high-level reflection. In any case, the timing logic 3390 only needs to know the starting time T1 of the period ΔT1 in order to generate its output signal. The bottom chart represents the output signal of the timing logic 3390, controlling the on/off state of the photon detector 3311, where a high-level indicates an off signal. As can be seen the photon detector 3311 is turned off at a time T3, for a duration ΔT3. The duration ΔT3 can advantageously be set to be shorter than ΔT1, for instance substantially similar to, or based on, the duration of the pulse generated by the emitting means 3100, as is schematically illustrated. The time T3 is separated by T1 by an interval ΔT2 that can be, for instance, substantially equivalent to the delay introduced by the optical delay element 3370. In this manner, once the high-level reflection, detected by the photon detector 3310, reaches the photon detector 3311, namely after a delay equivalent to ΔT2, the photon detector 3311 will be turned off for a time interval ΔT3, which is substantially lower than the time ΔT1. In this manner, it is possible for the photon detector 3311 to keep measuring the reflection from the fiber 1400 even after the high-level reflection event at T1, or, as seen from the photon detector 3311, at T3.

Figure 5:
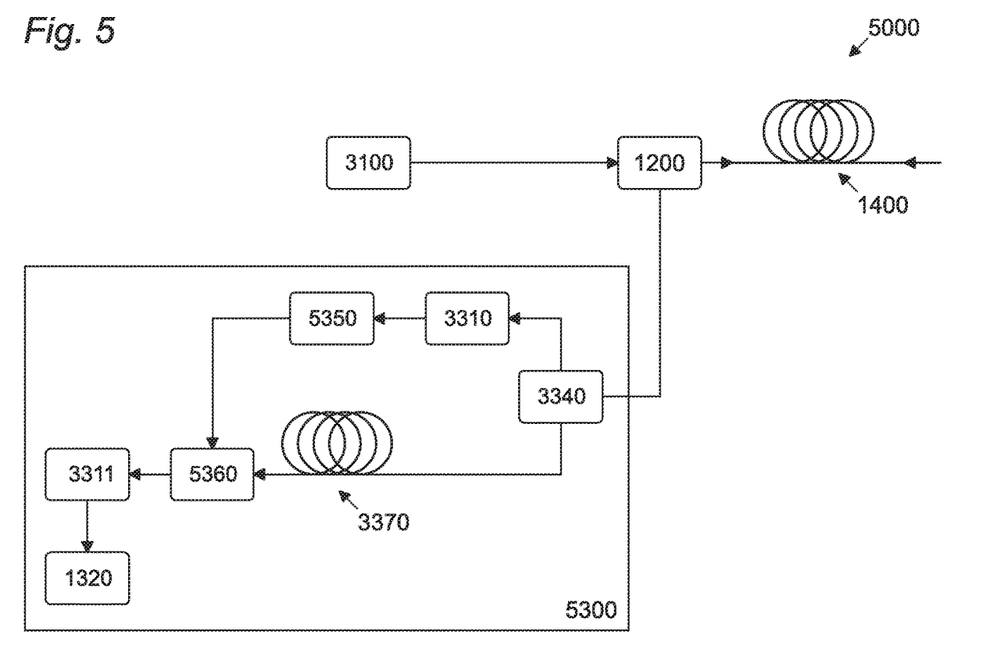
FIG. 5 schematically illustrates a measuring device 5000 according to an embodiment of the invention.

FIG. 5 schematically illustrates a measuring device 5000 according to an embodiment of the invention. The main difference between the measuring device 5000 and the measuring device 3000 is that measuring means 5000 further comprises an intensity modulating means comprising an intensity modulator 5360 connected between the optical fiber 1400 and the photon detector 3311. In particular, in the illustrated embodiment, the intensity modulator 5360 is connected between the optical delay element 3370 and the photon detector 3311. However, the invention is not limited thereto and, for instance, the intensity modulator could also be connected between the beam splitter 3340 and the optical delay element 3370. Generally, in this embodiment, instead of turning on and off the photon detector 3311, it is possible to allow or block the light from reaching the photon detector 3311.

In the illustrated embodiment, the measuring means 5300 further comprise an intensity modulator driver 5350 for driving the intensity modulator 5360. It will be clear that, in practice, the intensity modulator driver 5350 and the intensity modulator 5360 can be implemented by a single element. It will also be clear that the operation of the timing logic 3390 can be implemented by any of the intensity modulator driver 5350 and the intensity modulator 5360.

The intensity modulator 5360 is driven based on the output of the photon detector 3310 to control the reflected light reaching the photon detector 3311. More specifically, in a manner similar to previously described, the output of the photon detector 3310 can start the triggering of the intensity modulator driver 5350 that in turns switches the intensity modulator 5360. Even more specifically, the intensity modulator 5360 can be switched from a substantially transparent state to a substantially opaque state. In some embodiments, in the substantially transparent state, the intensity modulator 5360 can have a transmission coefficient of 50% to 100%. In some embodiments, in the substantially transparent state, the intensity modulator 5360 can have a transmission coefficient in the substantially opaque state which is at least 50 times, preferably at least 100 times smaller than the transmission coefficient in the substantially transparent state. In this manner the reflected light reaching the photon detector 3311 is controlled based on an output of the photon detector 3310. As previously described, the duration ΔT3 for which the intensity modulator 5360 can be controlled independently on the duration ΔT1 for which the output of the photon detector 3310 is saturated.

This embodiment provides, in comparison with the embodiment of FIG. 3, the advantageous effect that the photon detector 3311 does not need to be turned on and off, thus allowing the photon detector 3311 to remain on the entire time. This can provide a more reliable measurement after the time ΔT3 has passed and the light is allowed to pass through the intensity modulator 5360. Moreover, the intensity modulator 5360 may have a faster reaction time than the time required for turning on and off the photon detector 3311.

Figure 6:
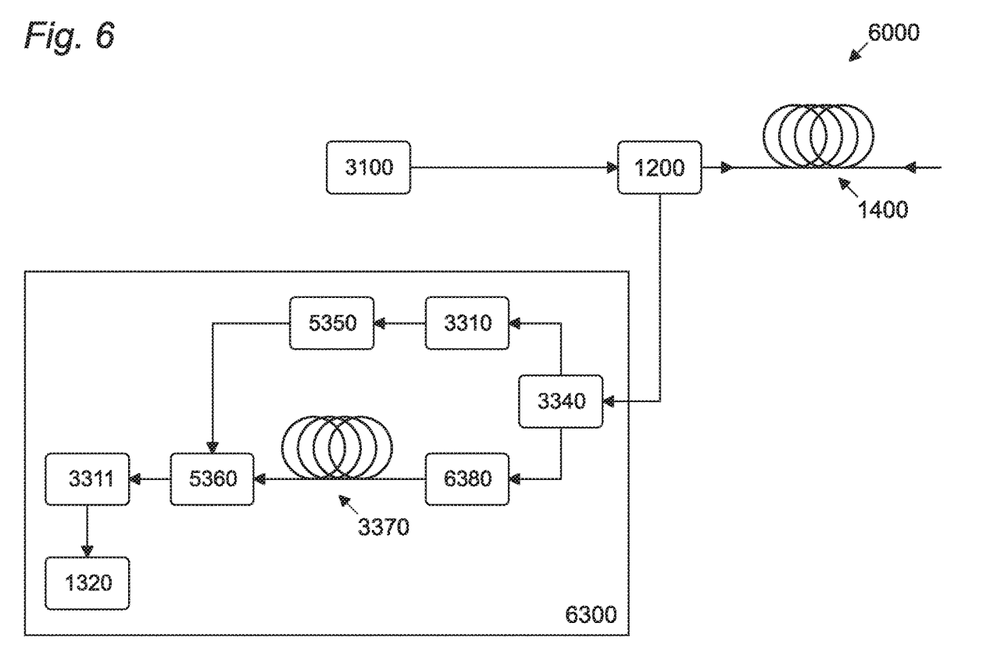
FIG. 6 schematically illustrates a measuring device 6000 according to an embodiment of the invention.

FIG. 6 schematically illustrates a measuring device 6000 according to an embodiment of the invention. The main difference between the measuring device 6000 and the measuring device 5000 is that measuring means 6000 further comprises an optical attenuator 6380, connected between the optical fiber 1400 and the photon detector 3311. In particular, in the illustrated embodiment, the optical attenuator 6380 is connected between the beam splitter 3340 and the optical delay element 3370. However, the invention is not limited thereto and, for instance, the optical attenuator 6380 could also be connected between the optical delay element 3370 and the intensity modulator 5360 or between the intensity modulator 5360 and the photon detector 3311.

The attenuator 6380 can advantageously reduce the amount of light reaching the photon detector 3311. This can be advantageous, for instance, when the photon detector 3310 is realized with a technology which requires a higher level signal, such as with a photodiode or, in general, when the sensibility of the photon detector 3311 is higher than the sensibility of the photon detector 3310. In this case, in order to provide a reflection with an intensity high enough for the photodiode 3310, the same signal may have an intensity too high for the photon detector 3311, in particular when the photon detector 3311 is a single-photon detector. The attenuator 6380 advantageously solves this problem. In some embodiments, the attenuator 6380 could have a transmission factor of less than for instance, 80%, preferably 50%

It will be clear that, in addition or as a replacement to the attenuator 6380, it is possible to implement a beam splitter 3340 which does not have a 50-50 split ratio but a split ratio in which the signal toward the photon detector 3310 is higher than the signal toward the photon detector 3311, such as a 80-20, or preferably 90-10 ratio.

It will be clear that the optical attenuator 6380, although illustrated on the basis of the measuring device 5000, could also be implemented in the measuring device 3000.

Thanks to the attenuator it is therefore possible to operate a photon detector 3310 which is simpler, and/or cheaper and/or faster than the photon detector 3311. In fact, the photon detector 3310 can operate with a powerful signal and only needs to recognize a high-level reflection, namely a signal having an intensity above a certain predetermined threshold.

In some advantageous embodiments, the optical delay element 3370 can introduce a delay $\Delta T2$ on the reflected light that is equal to, or longer than, a time required by the photon detector 3310 to detect the reflected light. In this case, the delay $\Delta T2$ therefore allows the photon detector 3310 to signal the saturation to the photon detector 3311, so as to turn it off, as previously described, before the high-level reflection reaches it.

In some advantageous embodiments, the optical delay element 3370 can introduce a delay $\Delta T2$ on the reflected light which is equal to, or longer than, a time required by the photon detector 3310 to detect the reflected light in addition to the time required for the intensity modulator 5360 and for the intensity modulator driver 5350 to switch from the substantially transparent state to the substantially opaque state. Also in this case the delay $\Delta T2$ can therefore be long enough to avoid the high-level reflection to cause a saturation of the photon detector 3310.

In case the photon detector 3310 drives the on/off state of the photon detector 3311, the value of $\Delta T2$ can be chosen so as to be equivalent to the reaction time of the photon detector 3310, plus the reaction time of any other element between the output of the photon detector 3310 and the input of the photon detector 3311, plus the time it takes to the photon detector 3311 to turn off after receiving an off signal.

In case the photon detector 3310 controls the intensity modulator 5360, the value of $\Delta T2$ can be chosen so as to be equivalent to the reaction time of the photon detector 3310, plus the reaction time of any other element between the output of the photon detector 3310 and the input of the intensity modulator 5360, plus the time it takes to the intensity modulator 5360 to switch from a substantially transparent state to a substantially opaque state.

In some advantageous embodiments, the value of $\Delta T3$ can be set to a minimum value equivalent to the pulse duration of the emitting means 3100. In some further advantageous embodiments, $\Delta T3$ can be set to a value which is at least 1.5 times, preferably at least 3 times, even more preferably at least 5 times the duration of the pulse emitted by the emitting means 1100. In this manner a correlation between the pulse duration and the time during which the photon detector 3311 is prevented form saturation can be advantageously dynamically adapted to different values of the pulse duration emitted by the emitting means 3100. It will be clear that, if the elements which are controlled by the time duration $\Delta T3$ are not fast enough to react within an interval as short as $\Delta T3$, they will be switched at the beginning of $\Delta T3$ and the subsequent switching will depend on how quickly they can be switched back.

As for $\Delta T2$, the value of $\Delta T3$ can be set to any maximum value. However, it is preferable to select a value of $\Delta T3$ that is smaller than $\Delta T1$, so as to allow the photon detector 3311 to measure the reflection signal during the time in which the photon detector 3310 cannot do so.

In the illustrated embodiments, the output of only the photon detector 3311 is connected to the time to digital converter 1320, so that only the measurement data from the photon detector 3311 is outputted by the measuring means 3300, 5300, 6300. However, the present invention is not limited thereto and also the data from the photon detector 3310 could be used as output of the measuring means, for instance in order to be combined with the output of the photon detector 3311, during the time in which the photon detector 3310 is not in saturation, in order to increase the precision of the output.

Figure 7:
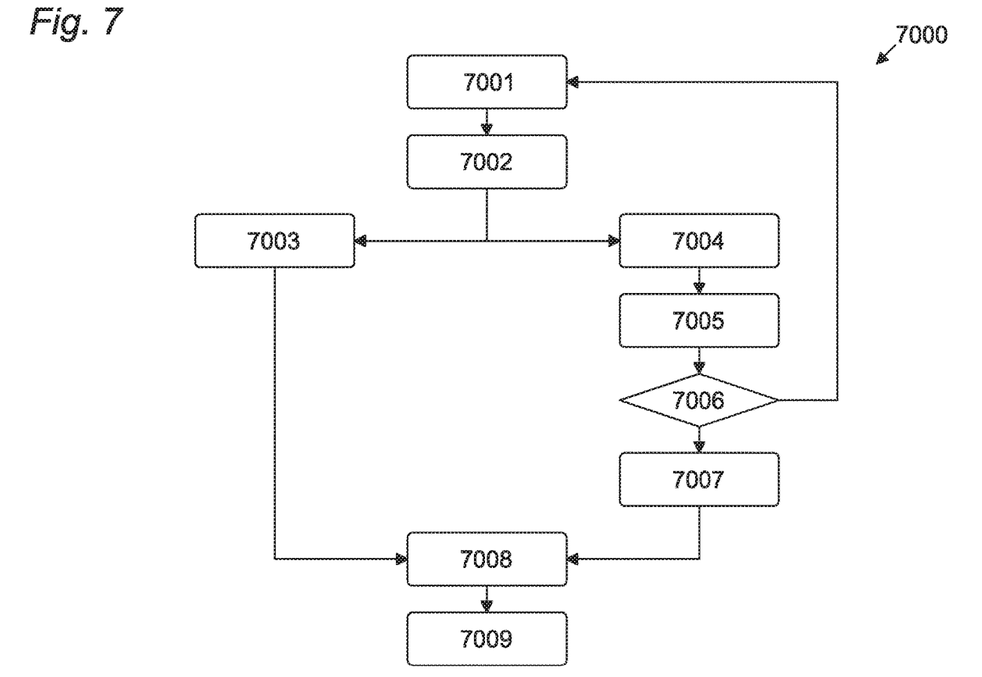
FIG. 7 schematically illustrates a measuring method 7000 according to an embodiment of the invention.

FIG. 7 schematically illustrates a measuring method 7000 according to an embodiment of the invention. In particular, the method 7000 can be implemented by measuring device 5000 or 6000. The modifications required for implementing a similar method for measuring device 3000 will be clear to those skilled in the art.

In a first emission step 7001, a light pulse, for instance a laser pulse, having a predetermined pulse duration is injected in the optical fiber 1400. The light pulse typically contains 1 million photons or more. Part of the light pulse is injected into the optical fiber 1400, while part may be reflected at the circulator 1200.

In a reflection generation step 7002, the light pulse will be partially back-reflected in the optical fiber 1400 at different positions of the optical fiber 1400. There are several mechanisms leading to back-reflection, as previously described. One is Rayleigh back scattering, illustrated by step 7003. Another is a reflection due to an optical connection, illustrated by step 7004. The latter reflection mode tends to generate much higher level of reflection at a given position of the optical fiber 1400, and therefore create a much higher level of reflected signal, as schematically corresponding to the reflection at time T1.

In particular, in both reflection steps 7003, 7004, the reflected light travels back to the circulator 1200 and is at least partially directed into the arm connected to the measuring means 3300, 5300, 6300. Rayleigh backscattering 7003 is a distributed reflection and leads to very small light levels, typically much less than one photon per time window T, where the time window T can be, for instance, approximately 1 ns. On the contrary, the light reflected from optical connections is likely to contain a number of photons that is typically of the order of one to one a few hundreds of photons per time window T.

In a detection step 7005 light incident on beam splitter 3340 is partially reflected towards photon detector 3310. This can lead either to a detection at photon detector 3310 or not, represented by bifurcating step 7006, leading to two possible situations that can then occur.

If photon detector 3310 triggers in bifurcating step 7006, then it is subsequently followed by masking step 7007, where the intensity modulator 5360 is set to a higher attenuation value $A_{max}$. This lowers the intensity of the light directed towards photon detector 3311 by a factor $A_{max}$.

In a subsequent detection step 7008 photon detector 3311 is much less likely to detect light that has saturated photon detector 3310. Thus the probability for the high amount of light reflected at the optical connections to reach the photon detector 3311 is lowered, which advantageously mitigates the deleterious effects associated with these pulses.

If photon detector 3310 does not trigger in bifurcating step 7006, the intensity modulator value is set to $A_{min}$ and the method continues its operation by sending subsequent optical pulses at the emission step 7001.

The method 7000 ends with a result outputting step 7009 consisting of a detection graph plot realization.

Figure 8:
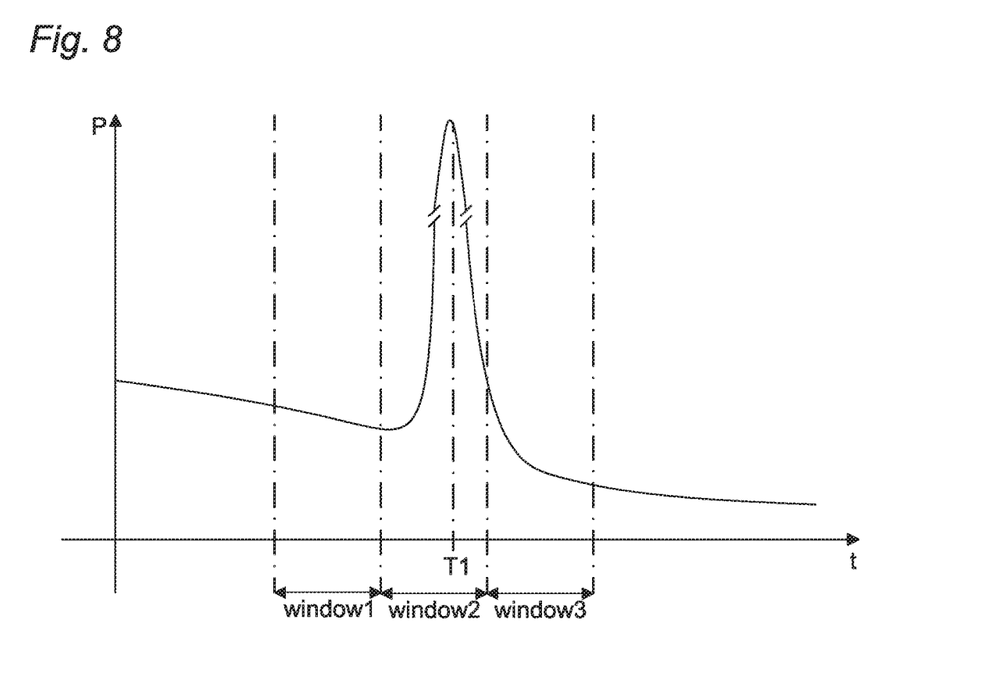
FIG. 8 schematically illustrates an exemplary reflection situation.
Figure 9:
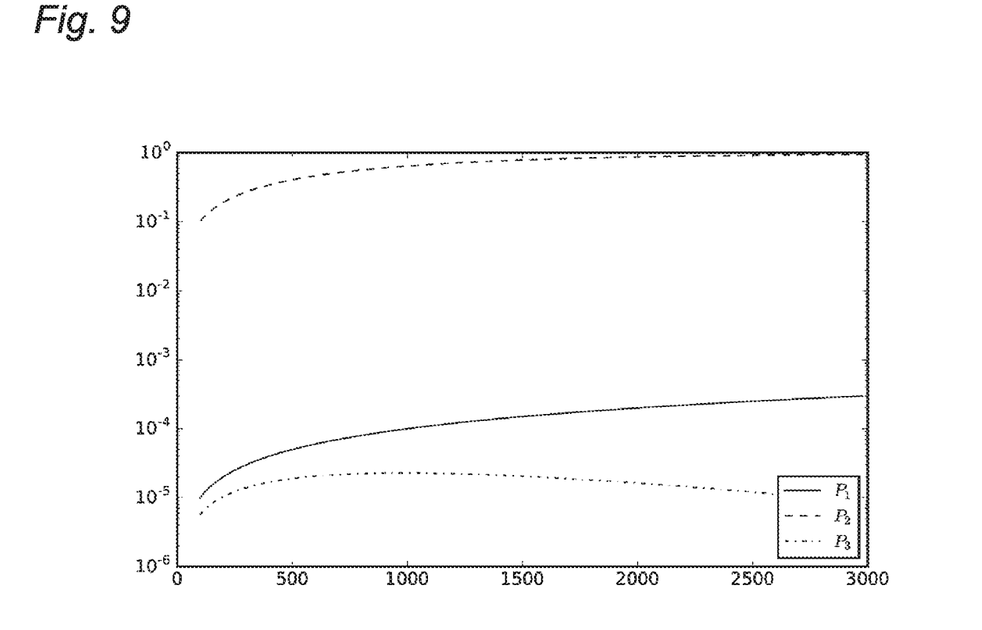
FIG. 9 schematically illustrates the performance of the prior art.
Figure 10:
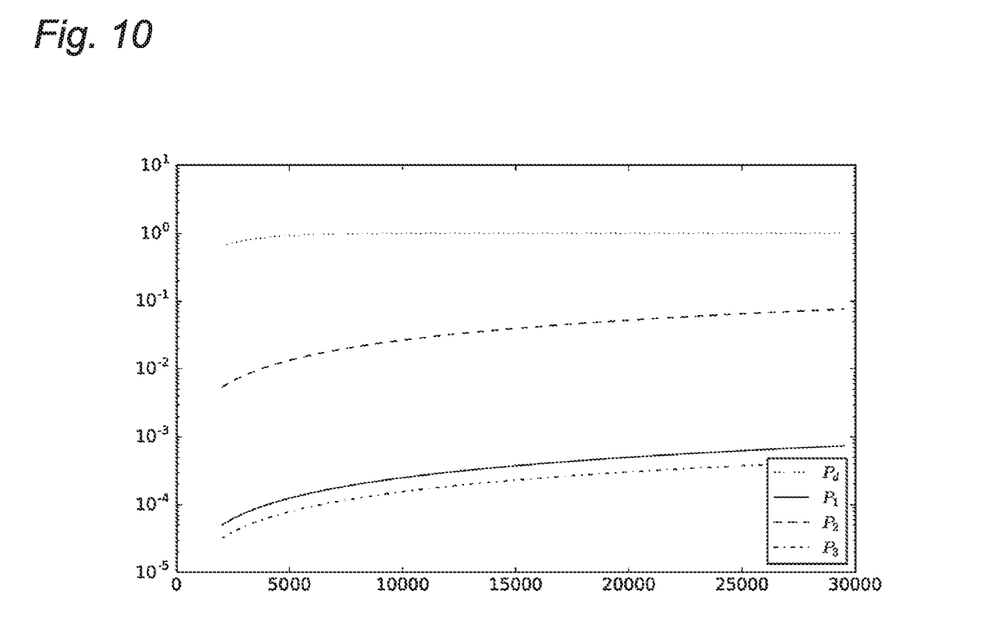
FIG. 10 schematically illustrates the performance of an embodiment of the invention.

FIG. 9 schematically illustrates the performance of the prior art and FIG. 10 schematically illustrates performance of an embodiment of the invention. In both figures, the X axis indicates the mean number of photons per pulse before the reflection while the Y axis indicates probability values. Both figures are based on the exemplary reflection schematically illustrated in FIG. 8. In particular, FIG. 8 illustrates three measuring windows 1, 2 and 3, for which the probability of the photon detector to trigger will be computed. Even more specifically, measuring window 2 comprises a high-level reflection at time T1. As previously described, if the probability of the photon detector to trigger at measuring window 2 is too close to 1, the photon detector will consistently be incapable of measuring the reflection in the measuring window 3, due to the dead-time and the measuring device will not be capable of knowing the reflection signal in the measuring window 3.

Starting from FIG. 9, the performance of the OTDR measurement based on only one photon detector 1310 are visible. The probability to get a detection in time window 1, in time window 2 and in time window 3, are respectively indicated as P1, P2 and P3. Here the effect of dark count single photon detectors is neglected.

Light in time window 1 is coming from the Rayleigh backscattered light, hence it is very dim and short. The probability P1 is assumed to be much smaller than one as illustrated. This is preferable to operate the OTDR, because if P1 is close to one, than the dead-time of the photon detector 1310 would strongly suppress detections coming after time window 1. If P1 is much smaller than one, then the photon detector 1310 is operating in a regime where P1 is proportional to the mean number of photons incident on the photon detector.

In this situation, P1 can be defined as $$P1 = c \cdot A_{RBS} \cdot \mu \cdot \eta \quad \text{(Eq. 1)}$$

where:
c is the overall transmission coefficient from the physical location of window 1 to the photon detector 1310, including all optical losses, the circulator 1200, but excluding the efficiency of the photon detector 1310;
$A_{RBS}$ is the probability for one photon to be reflected back toward the photon detector 1310 at the location of window 1 because of Rayleigh backscattering;
µ is the mean number of photons in the light pulse at the location of window 1 and corresponds to the X axis value;
η is the detection efficiency of the photon detector 1310.
For the plotting of FIG. 9 the following numerical values have been used: c=0.5, $A_{RBS}=10^{-6}$ and η=0.2.

A reflection caused by a connection of the optical fiber 1400 to another element is now considered. The number of photons incident on the photon detector 1310 that are coming from this reflection can be defined as:

$$\bar{\mu} = c \cdot A_r \cdot \mu \quad \text{(Eq. 2)}$$

where $A_r$ is the probability for one photon to be reflected at the connector. For the plotting of FIG. 9, $A_r=0.01$. In typical operating conditions, $c \cdot A_r \cdot \mu$ is higher than one.

From this, it is possible to calculate the probability P2 for the photon detector 1310 to click, or trigger. P2 is calculated assuming Poisson statistics distribution for the light pulse. The photon detector 1310 is also considered to be non-photon-number resolving, meaning that it does not differentiate between one or more than one photon. Here P2 can be defined as $$P2 = \sum_{n=0}^{\infty} p_n \cdot (1 - (1-\eta)^n) \quad \text{(Eq. 3a)}$$

where $$P_n = \frac{e^{-\bar{\mu}} \cdot \bar{\mu}^n}{n!} \quad \text{(Eq. 3b)}$$

Typically, P2 can be very close to one, as visible in FIG. 9.

Finally, a third situation is considered where the light is backscattered from a section of the fiber 1400, substantially right after fiber connection, corresponding to the window 3 location. As P1, also P3 is small, particularly compared to P2, and can be defined as $$P3 = c \cdot A_{RBS} \cdot A_{IL}^2 \cdot \mu \cdot (1-P^2) \cdot \eta \quad \text{(Eq. 4)}$$

where $A_{IL}$ is the transmission coefficient through fiber connection. This transmission is assumed to be independent from a direction, but this assumption is not necessary. For the plotting of FIG. 9, $A_{IL}=0.8$. It is to be noted that P3 is substantially proportional to $(1-P2)$ taking into account that the dead-time of the photon detector 1310 is suppressing the window 3 detection, due to the above-described overflow, if the photon detector 1310 clicked on light reflected in window 2. Hence, if P2 tends to one then P3 tends to zero and reflections from window 3 are suppressed and requires more care to be measured accurately, if at all possible.

It is to be noted that, in FIG. 9, P3 reaches a maximum value of approximately $2 \cdot 10^{-5}$ and does not increase, even if µ increases. The increasing value of µ causes, in fact, a suppression of P3, which limits the rate at which the data on window 3 can be collected. Moreover, the reflection at the fiber connection is artificially lowering P3 and complicating the estimation of the insertion loss, coming from the fact that $A_{IL}$ is smaller than one.

Moving now to FIG. 10, the results of an embodiment of the invention are illustrated.

A first probability Pd is calculated for the photon detector 3310 to click on the strong reflection coming, from instance, from the connection between the optical fiber 1400 and another element. This calculation is done assuming that photon detector 3310 is a single-photon detector, but it could also be a linear detector such as a PIN photodiode or an avalanche photodiode. In the latter case, it is preferable that the intensity of the reflected pulse is sufficiently large to lead to a probability Pd to detect the pulse that is close to one.

When using a single-photon detector for photon detector 3310, Pd can be defined as $$P_d = \sum_{n=0}^{\infty} p_n \cdot (1-(1-\eta)^n) \qquad \text{(Eq. 5a)}$$

where $$P_n = \frac{e^{-\bar{\mu}} \cdot \bar{\mu}^n}{n!} \qquad \text{(Eq. 5b)}$$

and $$\bar{\mu} = c \cdot A_r \cdot A_2 \cdot \mu \qquad \text{(Eq. 5c)}$$

with c and $A_r$ defined as in FIG. 9 and $A_2$ being the probability for a photon incident on the beam splitter 3340 to be transmitted to the photon detector 3310. The value of μ can be advantageously chosen such that Pd tends to one.

As described for FIG. 9, probabilities P1, P2 and P3 are calculated. As will be seen, the inventive method allows for the mitigation of P3 suppression due to large reflections. Here in particular the measuring device 6000 is assumed to be used. Therefore, $$P1 = c \cdot A_{RBS} \cdot (1-A_2) \cdot A_{Att} \cdot A_{max} \cdot \mu \cdot \eta \qquad \text{(Eq. 6)}$$

Where:
$(1-A_2)$ is the probability for a photon incident on the beam splitter 3340 to be directed toward the photon detector 3310;
$A_{att}$ is the transmission probability of the optical attenuator 6380;
$A_{max}$ is the transmission probability of the intensity modulator 5360 when it is set to its maximum transmission.

In the plotting of FIG. 10, the following numerical values have been used: $A_{att}=1$ and $A_{max}=0.5$.

The probability P2 is calculated as $$P2 = \sum_{n=0}^{\infty} p_n \cdot (1-(1-\eta)^n) \qquad \text{(Eq. 7a)}$$

where $$P_n = \frac{e^{-\bar{\mu}} \cdot \bar{\mu}^n}{n!} \qquad \text{(Eq. 7b)}$$

and $$\bar{\mu} = c \cdot A_r \cdot (1-A_2) \cdot A_{att} \cdot A_{min} \cdot \mu \qquad \text{(Eq. 7c)}$$

Where $A_{min}$ is the transmission probability of the intensity modulator 5360 when it is set to its minimum transmission.

In the plotting of FIG. 10, the following numerical values have been used: $A_{min} = A_{max}/100$ corresponding to a 20 dB attenuation.

At the same time, the probability P3 can be calculated as:

$$P3 = c \cdot A_{RBS} \cdot A_{IL}^2 \cdot (1-A_2) \cdot A_{Att} \cdot A_{max} \cdot \mu \cdot \eta \cdot (1-P2) \qquad \text{(Eq. 8)}$$

As can be seen when comparing FIGS. 9 and 10, over the considered range of μ values, Pd is substantially close to 1 while P2 is much smaller than 1. Thanks to this, P3 is not suppressed. In fact, P3 is higher than $10^{-4}$ for a large range of μ values and is approximately ten times greater than the largest value obtained by the prior art illustrated in FIG. 9.

It can therefore be seen how the present invention allows a higher probability of detection P3 in the measuring window 3, namely the measuring window just after a connection of the optical fiber 1400 to another element, which causes the high-level reflection, and the respective saturation, rendering the prior art not usable. It can therefore be concluded that the present invention allows the measuring of the region after the connection, without using the time consuming method of the moving measuring window described by the prior art, but rather in a fast and effective manner.

Although several embodiments have been separately described above, for clarity of exposition, it will be clear to those skilled in the art that any features of any of the described embodiments can be used in combination of any features of any other of the described embodiments, within the scope of the invention as defined by the claims.

LIST OF REFERENCE NUMERALS

1000: measuring device
1100: emitting means
1110: pulse driver
1120: Fabry-Perot laser
1130: acousto-optic modulator
1140: pulse pattern generator
1200: circulator
1300: measuring means
1310: photon detector
1320: time to digital converter
1330: data acquisition terminal
1400: optical fiber
3000: measuring device
3100: emitting means
3300: measuring means
3310, 3311: photon detector
3340: beam splitter
3370: optical delay element
3390: timing logic
5000: measuring device
5300: measuring means
5350: intensity modulator driver
5360: intensity modulator
6000: measuring device
6300: measuring means
6380: optical attenuator
7000: measuring method
7001: emission step
7002: reflection generation step
7003: low level Rayleigh reflection step
7004: high-level reflection step
7005: detection step
7006: bifurcating step
7007: masking step
7008: detection step
7009: result outputting step
T1, T2: time instant
Twin: measuring window
ΔT1, ΔT2, ΔT3: time interval

The invention claimed is:
1. A measuring device for measuring reflection in an optical fiber (1400), the device comprising:
   emitting means (3100) connected to the optical fiber (1400) and configured to emit light into the optical fiber (1400),
   measuring means (3300, 5300, 6300) connected to the optical fiber (1400) and configured to receive a reflected light from the optical fiber (1400),
   wherein the measuring means comprises a first photon detector (3310) and a second photon detector (3311), a beam splitter configured to connect the optical fiber to both the first photon detector and the second photon detectors, and an optical delay element connected between the beam splitter and the second photon detector, wherein the optical delay element is configured to introduce a delay on the reflected light from the optical fiber, wherein the operation of the second photon detector (3311) or the reflected light reaching the second photon detector (3311) is controlled based on an output of the first photon detector (3310).

2. The measuring device according to claim 1, wherein the measuring means further comprises an intensity modulator (5360), connected between the optical fiber (1400) and the second photon detector (3311), and wherein the intensity modulator (5360) is driven based on the output of the first photon detector (3310) so as to control the reflected light reaching the second photon detector (3311).

3. The measuring device according to claim 1, wherein the optical delay element (3370) introduces a delay ($\Delta T2$) on the reflected light which is equal to, or longer than, a time required by the first photon detector (3310) to detect the reflected light.

4. The measuring device according to claim 2, wherein the emitting means (3100) is configured to emit a pulse of light having a predetermined pulse duration, the intensity modulator (5360) is configured to switch for a switching time ($\Delta T3$) equal to or larger than the pulse duration.

5. The measuring device according to claim 4, wherein the switching time ($\Delta T3$) is at least 1.5 times the pulse duration.

6. The measuring device according to claim 1, further comprising an optical attenuator (6380), connected between the optical fiber (1400) and the second photon detector (3311).

7. The measuring device according to claim 2, wherein the measuring means further comprises an intensity modulator driver coupled between the first photon detector and the intensity modulator, wherein the intensity modulator driver drives the intensity modulator based on the output of the first photon detector.

8. The measuring device of claim 1, wherein the measuring means further comprises a timing logic coupled to the second photon detector to issue a control signal based on the output of the first photon detector to turn off the second photo detector.

9. The measuring device of claim 1, wherein the first photon detector is configured to turn off the second photon detector based on the output.

10. The measuring device of claim 9, wherein the first photon detector is configured to switch the output to turn off the second photon detector when the reflected light is above a threshold.

* * * * *